United States Patent
Nehls

(10) Patent No.: US 8,862,312 B2
(45) Date of Patent: Oct. 14, 2014

(54) DIAGNOSIS OF A PERSON PROTECTION SYSTEM

(75) Inventor: Wolfgang Nehls, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 153 days.

(21) Appl. No.: 13/451,733

(22) Filed: Apr. 20, 2012

(65) Prior Publication Data

US 2012/0271509 A1    Oct. 25, 2012

(30) Foreign Application Priority Data

Apr. 21, 2011 (DE) .................. 10 2011 007 881

(51) Int. Cl.
*G01M 99/00* (2011.01)

(52) U.S. Cl.
USPC .............. 701/30.7; 340/436; 701/45; 701/46; 701/47; 701/30.4

(58) Field of Classification Search
CPC .......... B60R 2021/01184; B60R 2021/01027; B60R 2021/01129
USPC ............... 701/45, 46, 47, 30.4–30.7; 340/436
See application file for complete search history.

(56) References Cited

U.S. PATENT DOCUMENTS

| | | | | |
|---|---|---|---|---|
| 5,506,454 | A * | 4/1996 | Hanzawa et al. | 307/10.1 |
| 6,064,928 | A * | 5/2000 | Wilson et al. | 701/30.4 |
| 2006/0229785 | A1* | 10/2006 | Baur et al. | 701/45 |
| 2007/0208475 | A1* | 9/2007 | Shimizu | 701/45 |
| 2008/0165467 | A1* | 7/2008 | Bierbrauer et al. | 361/160 |
| 2010/0030433 | A1* | 2/2010 | Suzuki | 701/45 |
| 2011/0035115 | A1* | 2/2011 | Schumacher | 701/45 |

FOREIGN PATENT DOCUMENTS

| | | | |
|---|---|---|---|
| DE | 4316263 | A1 * | 11/1993 |
| DE | 101 14 465 | A1 | 9/2002 |
| DE | 10114465 | A1 * | 9/2002 |
| DE | 10 2004 031 575 | A1 | 2/2006 |
| DE | 10 2004 031 577 | A1 | 2/2006 |
| DE | 10 2004 034 877 | A1 | 2/2006 |

(Continued)

OTHER PUBLICATIONS

USPTO Scientific Technology Information Center Search Report, Nov. 2013.*

(Continued)

*Primary Examiner* — Fadey Jabr
*Assistant Examiner* — Thomas Ingram
(74) *Attorney, Agent, or Firm* — Crowell & Moring LLP

(57) ABSTRACT

A device controls a person protection system of a motor vehicle having a sensor system which, for detecting an object colliding with the motor vehicle, includes a hose arranged along a body section width of the vehicle and closed-off by a pressure sensor on at least one end. In the event of an impact with an object, a pressure change is caused in the hose interior due to deformation of the hose and is detectable as a pressure signal of the pressure sensor by an evaluating unit connected with the pressure sensor. The evaluating unit detects vibrations originating from the motor vehicle during a driving and testing operation and coupled into the hose, which vibrations result in pressure fluctuations in the hose interior which are lower than a pressure fluctuation caused by an impacting object, and evaluates these vibrations for a predefined time period for diagnostic purposes.

20 Claims, 1 Drawing Sheet

(56) References Cited

FOREIGN PATENT DOCUMENTS

| DE | 10 2004 055 402 A1 | | 5/2006 |
| DE | 102004055402 A1 | * | 5/2006 |
| DE | 10 2007 044 814 A1 | | 4/2009 |
| DE | 10 2009 048 067 A1 | | 4/2011 |

OTHER PUBLICATIONS

German Search Report dated Jul. 7, 2011 with Partial English translation (ten (10) pages).

* cited by examiner

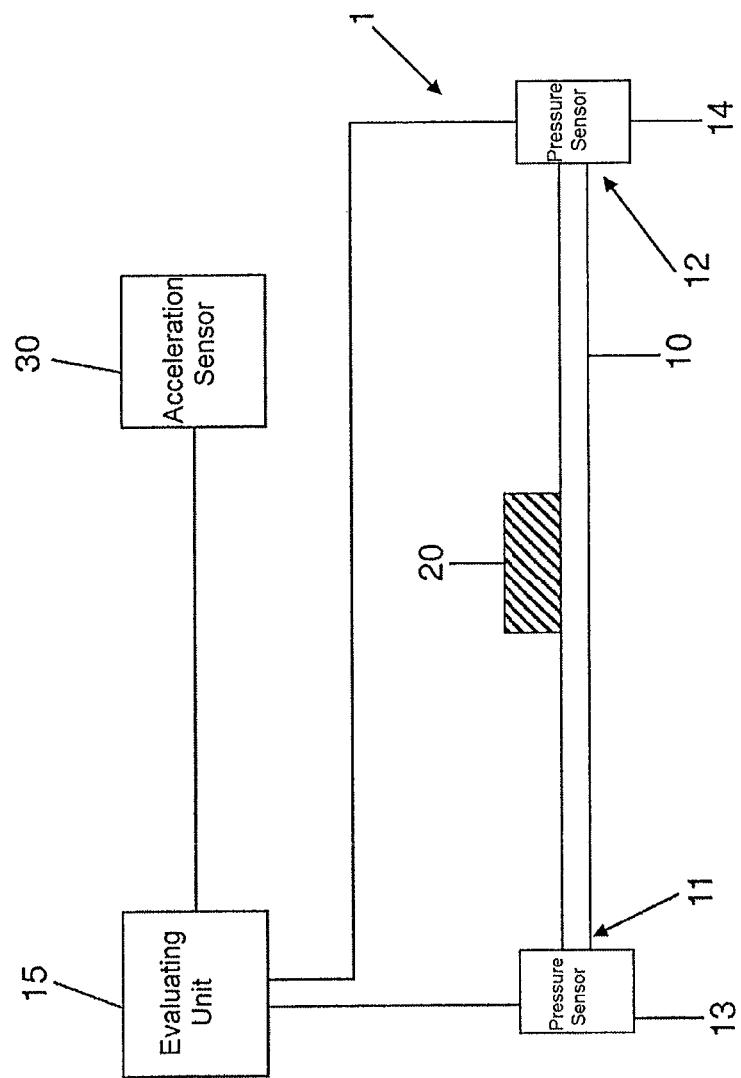

DIAGNOSIS OF A PERSON PROTECTION SYSTEM

CROSS-REFERENCE TO RELATED APPLICATION

This application claims priority under 35 U.S.C. §119 from German Application No. DE 10 2011 007 881.9, filed Apr. 21, 2011, the entire disclosure of which is herein expressly incorporated by reference.

BACKGROUND AND SUMMARY OF THE INVENTION

The invention relates to a device and a process for controlling a person protection system of a motor vehicle having a sensor system which, for the detection of an object colliding with the motor vehicle, includes a hose that is arranged along the width of a body section of the motor vehicle and is closed off by way of a pressure sensor on at least one of its ends. The hose is arranged in the motor vehicle such that, in the event of an impact of the object, a pressure change is caused in the hose interior as a result of the deformation of the hose and can be detected and processed as a pressure signal of the at least one pressure sensor by an evaluating unit connected with the at least one pressure sensor.

Such devices are normally provided in front bumpers of motor vehicles. The sensor system has the purpose of detecting the impact of a pedestrian and, as a supplement to a passive energy absorption by an impact-absorbing material integrated in the bumper, initiating additional active protective measures for the pedestrian or bicyclist. These measures may consist, for example, of raising an engine hood or other flap. This helps prevent the hit pedestrian or bicyclist from being seriously injured or killed by the impact on the engine hood and the engine block situated underneath. Valuable protective space is created by the additional centimeters of distance between the engine hood and engine block, which considerably alleviates the results of an accident.

So far, optical waveguides or acceleration sensors have been used as sensors for detecting a pedestrian impact. In the meantime, so-called pressure hose sensors are known, where, as a rule, two air pressure sensors are mutually connected by way of the hose. The hose as well as the pressure sensors are integrated in the so-called front end of the motor vehicle between a supporting cross member and a plastic covering of the bumper in an extruded plastic foam. In this case, the hose is placed in the bumper of the motor vehicle over the entire width of the vehicle. The hose is situated directly behind a block consisting of the plastic foam which is installed in the bumper as an energy absorbing device. The pressure sensors arranged at the two ends of the pressure hose filled with air are standardized pressure sensors which can also be used, for example, for activating airbags of the motor vehicle in the event of a side impact. The bumper is deformed when the motor vehicle collides with an obstacle. The corresponding deformation leads to a pressure change in the hose, which pressure change is detected by the pressure sensors. The electrical signals are evaluated by an evaluating unit, for example, an airbag control device. The type of the collision can be calculated by way of crash algorithms in the evaluating unit and speed information. By means of signal traveling times, conclusions can also be drawn on the impact location; for example, whether the impact was at the front right or more in the vehicle center. As a function of the signal pattern, suitable protection systems can then be activated in time.

The sensor system has to reliably recognize a collision between a vehicle and a pedestrian, irrespective of whether the person involved in the accident is a small child or a grown man. Furthermore, the sensors should determine in a highly reliable manner whether a so-called "no-fire" case exists in which the protection systems should absolutely not be triggered. Such events are, for example, the touching of a curb by means of the bumper or a collision with a small animal.

The pressure hose sensor system offers good performance as well as advantages for the mechanical integration in a motor vehicle. In addition, it is very cost-effective compared with other known sensor systems. A disadvantage of pressure hose sensor systems consists of the fact that, so far, it has not been possible to completely test these systems electrically via a diagnosis with respect to their functioning. Only an electrical testing of the pressure sensors is possible, whereas the pressure hose and its connection to the pressure sensors cannot be tested in this manner with respect to the appropriate functioning. A faulty condition of the pressure hose may be caused, for example, by a marten bite. Likewise, a pressure sensor could become detached from the hose in the course of the service life of the motor vehicle. This disadvantage stands in the way of a rapid propagation of the system.

It is an object of the present invention to provide a device and a process which permit the complete diagnosis of a passenger protection system based on a pressure hose sensor system.

This and other objects are achieved by a device and process for controlling a person protection system of a motor vehicle having a sensor system which, for the detection of an object colliding with the motor vehicle, comprises a hose that is arranged along the width of a body section of the motor vehicle and is closed off by means of a pressure sensor on at least one of its ends. The hose is arranged in the motor vehicle such that, in the event of an impact of the object, a pressure change is caused in the hose interior as a result of the deformation of the hose and can be detected and processed as a pressure signal of the at least one pressure sensor by an evaluating unit connected with the at least one pressure sensor. The evaluating unit for diagnosing the sensor system is constructed for detecting vibrations originating from the motor vehicle during the driving and testing operation and coupled into the hose, which vibrations result in pressure fluctuations in the hose interior which are lower than a pressure fluctuation caused by an impacting object and for evaluating these vibrations for a predefined time period.

The invention further provides a process for controlling a person protection system of a motor vehicle having a sensor system of the above-described type, wherein the evaluating unit for diagnosing the sensor system detects vibrations originating from the motor vehicle during the driving and testing operation and coupled into the hose, which vibrations result in pressure fluctuations in the hose interior which are lower than a pressure fluctuation caused by an impacting object and evaluates these vibrations for a predefined time period.

The invention is based on the consideration that a pressure hose sensor system like the one described in the background above is no longer accessible from the outside after it is integrated into the motor vehicle. Although the pressure sensor or sensors can be electrically tested with respect to an appropriate operability in a conventional manner, the (pressure) hose connected with the pressure sensor or sensors is not accessible for such a diagnosis. In particular, a visual inspection of the pressure hose can also not take place because of its special arrangement inside or behind a block made of plastic foam, which is installed in a bumper as an energy absorber.

According to an aspect of the invention, a diagnosis of the pressure hose, including its linkage to the at least one pressure sensor and thereby of the sensor system as a whole, is carried out in an indirect manner. As the driver is operating the motor vehicle, vibrations are transmitted to the motor vehicle during every movement of the vehicle. These vibrations are coupled into the sensor system including the hose partially also as very slight interferences. In order to obtain information concerning the operability of the sensor system, the interferences coupled into the sensor system are evaluated. Since these interferences are very slight and can therefore not provide any information concerning the operability of the sensor system within a short time period, the evaluation takes place over an extended time period, for example, several minutes, hours or even days.

For diagnosing the sensor system, it can, for example, be examined by the evaluating unit whether certain threshold values for the pressure fluctuation occur in a predefined number within the predefined time period. For example, the occurrence of a comparatively high pressure fluctuation (which, however, would then still be considerably lower than the pressure fluctuation caused by an impacting object) may indicate the appropriate operability of the sensor system. Such a comparatively high pressure fluctuation may occur, for example, when driving through a pothole. When the motor vehicle is moving along a road with a good even surface, under certain circumstances, no significant pressure fluctuations may be detected for a fairly long time period. During this time period, the occurrence of a plurality of comparatively small pressure fluctuations may provide information on the operability of the sensor system.

On the whole, corresponding information concerning the operability of the hose or of the sensor system can be written, for example, into a memory of the evaluating unit. If the state of the sensor system corresponds to a defined fault case, corresponding information can be emitted, for example, by way of a control light or a display of the motor vehicle. The information optionally stored in the memory of the evaluating unit can also be read out of the evaluating unit and be evaluated within the scope of a service shop visit.

It was found to be sufficient for the pressure fluctuations caused by the driving or testing operation to amount to not more than one tenth of the pressure fluctuation caused by an impacting object. In this manner, it can also be ensured that a sufficiently large interval exists between a pressure fluctuation for the verification of the operability of the sensor system and an actual triggering case. On the other hand, pressure fluctuations in the above-mentioned range are sufficient for a differentiation of the latter from a statistical noise of the pressure sensors. Depending on the further development of the pressure hose, the maximum for the pressure fluctuation may also be selected to be different.

Furthermore, it is advantageous to fasten a source of interference to the hose or to arrange it relative to the hose, which source of interference transmits the vibrations originating from the motor vehicle in an amplified manner to the hose. In order to cause a pressure fluctuation, the hose is deformed locally at the site of the interference source. In this case, the source of the interference does not have to be of an active nature, for example, be constructed in the form of a compressor or of an actuator. In contrast, for reasons of cost, passively acting interference sources, such as mass-type bodies, are preferable, which transmit only one vibration caused by the motor vehicle in an amplified manner to the hose in order to artificially cause the measurable pressure fluctuation required for detection purposes.

It is advantageous for the interference source to be arranged or constructed such that the latter is excited by the vibrations originating from the motor vehicle to perform a movement in the direction of the vertical axis of the motor vehicle. As a result, the gravitational force can advantageously be utilized for intensifying the pressure fluctuation occurring in the hose. In this case, the interference source is advantageously arranged in the direction of the gravitational force above and below the hose. In particular, the device can be implemented in a constructively simple manner if the interference source leads to a compressing of the hose for causing a pressure fluctuation. Depending on the local situation, the excitation may also take place in a direction deviating from the vertical line.

It is also advantageous for the interference source to be arranged in the center between the two ends of the hose. This variant is particularly advantageous in the case of pressure sensors provided at both ends of the hose because the pressure fluctuation then has to be perceived equally by both sensors.

In principle, for reasons of a precise detection, it is advantageous for the sensor system to have two pressure sensors that are arranged at the two opposite ends of the hose, which sensors close off the hose. In this case, it is possible to mutually correlate the signals supplied by the two pressure sensors. The detection precision can thereby be increased—even in the case of only slight pressure fluctuations.

As described above, it is advantageous for the interference source to be a mass-type body. The latter can be fastened, for example, to the exterior surface of the hose. Its weight can define in a simple manner which pressure fluctuations are caused in the case of which external interference in the pressure hose system. The suitable mass can be determined by experimenting because this mass may be dependent on the design of the chassis.

A further improvement of the diagnosis of the sensor system can be achieved in that the device includes an acceleration sensor, particularly a chassis sensor system which provides a time-dependent acceleration signal that can be processed for a qualitative evaluation of the pressure signal by the evaluating unit. Advantageously, such acceleration sensors are already available in vehicles so that only the acceleration values supplied by this sensor have to be linked in the evaluating unit with the signals supplied by the pressure sensors.

For example, by use of the acceleration sensors, accelerations caused as a result of an unevenness of the ground or of potholes are detected (in the direction of the vertical axis of the vehicle, i.e. of the z-axis). These significant accelerations in the z-axis direction also become noticeable as an interference in the hose of the sensor system. In the case of an appropriate operability of the sensor system, in the event of the occurrence of such acceleration signals, pressure signals of the pressure sensors representing pressure fluctuations also have to be detected in the evaluating unit. If this is so, a conclusion can be drawn on an appropriate functioning of the pressure hose system.

However, if such a time-related correlation does not exist, there may be a malfunctioning of the pressure hose sensor system. By means of other sensor system data, particularly acceleration values, the data supplied by the pressure sensors can thereby be made plausible. Likewise, it is contemplated to include the data made available by other sensors for the extraction of pressure fluctuations caused by an interference.

All information required for the diagnosis of the sensor system can be processed in a single evaluating unit, for example, an airbag control device. The invention can therefore advantageously be implemented by the corresponding adaptation of the software for the evaluating unit and can be provided in a cost-effective manner.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a schematic representation of an exemplary device according to the invention for controlling a person protection system of a motor vehicle.

DETAILED DESCRIPTION OF THE DRAWING

The device includes a sensor system 1 which, for the detection of an object impacting on the motor vehicle, has a hose 10, such as a silicone hose, as well as pressure sensors 13, 14 connected thereto at its opposite ends 11, 12. A mass-type body 20 is arranged as an interference source at the silicone hose 10 approximately in the center, above the hose 10 in the gravitational direction. The hose 10 is placed along the entire vehicle width in a bumper of the motor vehicle (not shown). As initially described, the hose 10 is situated directly behind a block (not shown) consisting of plastic foam which is installed in the bumper as an energy absorbing device. The pressure sensors 13, 14 arranged at the two ends 11, 12 of the pressure hose 10 filled with air are standardized pressure sensors which are also inserted, for example, for activating airbags of the motor vehicle in the event of a side impact into the doors of motor vehicles.

When the motor vehicle now collides with an obstacle, a typical signal pattern is obtained from the pressure that is exercised upon the hose 10 by way of the front spoiler of the bumper and the plastic foam, which signal pattern is determined by the two pressure sensors 13, 14 and is transmitted to an evaluating unit 15. The evaluating unit 15 may, for example, represent the control device of the person protection system. The control device may, for example, be an airbag control system which centrally triggers all airbags of the motor vehicle.

By way of crash algorithms provided in evaluation software of the evaluating unit 15 as well as in connection with speed information, which is provided by another sensor (not shown in the FIGURE) of the evaluating unit 15, the evaluating unit can compute within a short time which type of collision is occurring. By use of signal travel times of the two pressure sensors 13, 14, conclusions can also be drawn on the impact location; for example, whether the impact took place from the right or more in the vehicle center.

For diagnosing the sensor system, particularly with respect to damage to the hose 10 or a damaged connection of the hose 10 to one or both of the pressure sensors 13, 14, vibrations are processed, which vibrations originate from the motor vehicle during the driving and testing operation and are coupled into the hose. These vibrations result in pressure fluctuations in the hose interior. In order to intensify the vibrations that are transmitted as a result of the vibrations of the vehicle and to the hose 10, the optional mass-type body 20 is provided on the hose 10. The mass-type body, which acts as an interference source of a mechanical type and is arranged above the hose 10 in the gravitational direction, in the event of an acceleration acting upon the motor vehicle in the direction of the vertical axis (z-axis), compresses the hose 10 for causing a pressure fluctuation so that an interference detectable by the pressure sensors 13, 14 is coupled into the sensor system. As a result of the interference intensified by the mass-type body, increased signal amplitudes are obtained for evaluating the operability of the sensor system. In this case, the signal amplitudes required for evaluating the operability are considerably lower than the signal amplitude of the pressure fluctuation caused by an impacting of the object. It was found to be sufficient for the pressure fluctuations caused by the driving or testing operation to amount to not more than one tenth of the pressure fluctuation caused by an impact with an object.

In order to obtain information on the operability, a long-term evaluation of the pressure fluctuations detected by the pressure sensors preferably takes place. In this context, "long-term" means that—as a function of the vibrations transmitted to the motor vehicle—, at least several minutes go by until a result is obtained. When the motor vehicle is traveling on an unpaved or bad road, a few, but significant pressure fluctuations (which are still considerably lower than the pressure fluctuation caused by an impacting object) may already be sufficient for evaluating the operability of the sensor system as given. When, in contrast, the motor vehicle is traveling on a road with an even road surface, such as a federal highway, turnpike, etc., several hours may easily pass until a decision is obtained concerning the operability of the sensor system.

It is particularly advantageous to make the signals supplied by the pressure sensors 13, 14 and representing pressure fluctuations plausible by use of other sensor data present in the motor vehicle. For this purpose, acceleration sensors, in particular, can be used. In the schematic representation of FIG. 1, an acceleration sensor 30, for example, a chassis control system (assistance system), is plotted whose data are made available to the evaluating unit 15. As illustrated in FIG. 1, the sensor 30 can be connected directly with the evaluating unit 15, if, for example, also the information concerning the assistance system is processed by the evaluating unit 15. If the assistance system, to which the sensor 30 is assigned, has its own control unit, the corresponding acceleration data are transmitted by way of the not shown control device of the assistance system to the evaluating unit 15.

By use of the acceleration values transmitted by the acceleration sensor 30 to the evaluating unit, mainly in the z-direction, a correlation can be established to the data of the pressure sensors 13, 14. Thus, in the event of an acceleration in the direction of the z-axis (which corresponds to the gravitational direction) and a detected pressure fluctuation which corresponds with respect to time, a conclusion can be drawn on an appropriate functioning of the sensor system 1.

The data provided by the acceleration sensor 30 may also be used for processing the data transmitted from the pressure sensors 13, 14 to the evaluating unit with one another such that background noise of the data of the pressure sensors is eliminated.

Since, for carrying out the diagnosis according to the invention, all necessary information is present in the evaluating unit 15 or can be provided to it, the expenditures for implementing the diagnosis are purely software-oriented, whereby the diagnosis can be implemented very cost-effectively.

As explained above, the diagnosis takes place during the driving operation. Erroneous warnings, for example, the flashing of a control light in the motor vehicle, can be excluded by corresponding long-term evaluations. In contrast to the classical diagnosis which carries out an examination in an electrical manner, in the case of the diagnosis provided herein, an observation time is to be provided as it is also provided, for example, in the case of systems for tire pressure control. This has the result that possibly occurring faults of the sensor system 1 are emitted in a delayed manner.

In order to be able to examine the sensor system 1, for example, during a stay in a service shop, the corresponding long-term evaluation in the evaluating unit 15 can be deactivated temporarily. An excitation of the vehicle body vibration, which is then transmitted to the sensor system 1, can, for example, be generated by unevenness in a roller-type test stand or an actively controlled roller-type test stand. As a result, a significant pressure fluctuation can be caused in the hose 10 which then has to be detected by the evaluating unit 15 during the short time available for testing purposes.

List of Reference Numbers
1 Sensor system
10 Hose
11 First end of hose
12 Second end of hose
13 Pressure sensor
14 Pressure sensor
15 Evaluating unit
20 Interference source
30 Acceleration sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for controlling a person protection system of a motor vehicle, comprising:
    a sensor system that detects an object colliding with the motor vehicle, the sensor system comprising:
    a hose arrangeable along a width of a body section of the motor vehicle;
    a pressure sensor operatively arranged to close-off at least one end of the hose, wherein a pressure change is caused in an interior of the hose due to deformation of the hose by an impact of the object with the motor vehicle, the pressure change being detectable and processable as a pressure signal of the pressure sensor;
    an evaluating unit operatively coupled with the pressure sensor and receiving the pressure signal;
    wherein the evaluating unit is operatively configured to detect vibrations originating from the motor vehicle and coupled into the hose during a driving operation, said vibrations resulting in pressure fluctuations in the interior of the hose that are lower than a pressure fluctuation caused by an impacting object; and
    wherein the evaluating unit is operatively configured to evaluate the vibrations for a predefined time period in order to diagnose damage to at least one of the hose and to a connection of the hose to the pressure sensor.

2. The device according to claim 1, wherein the pressure fluctuations caused by the driving operation are no greater than one tenth of a pressure fluctuation caused by an impacting object.

3. The device according to claim 2, further comprising:
    an interference source operatively coupled to the hose, the interference source transmitting the vibrations originating from the motor vehicle in an amplified manner to the hose in order to cause the pressure fluctuations by deforming the hose locally at a site of the interference source.

4. The device according to claim 3, wherein the interference source is operatively arranged so as to be excitable by the vibrations originating from the motor vehicle in order to perform movement in a vertical axis direction of the motor vehicle.

5. The device according to claim 1, further comprising:
    an interference source operatively coupled to the hose, the interference source transmitting the vibrations originating from the motor vehicle in an amplified manner to the hose in order to cause the pressure fluctuations by deforming the hose locally at a site of the interference source.

6. The device according to claim 5, wherein the interference source is operatively arranged so as to be excitable by the vibrations originating from the motor vehicle in order to perform movement in a vertical axis direction of the motor vehicle.

7. The device according to claim 6, wherein the interference source is arranged above or below the hose in a gravitational direction.

8. The device according to claim 6, wherein the interference source is operatively configured to cause a compression of the hose.

9. The device according to claim 6, wherein the interference source is arranged in a center region between two ends of the hose.

10. The device according to claim 5, wherein the interference source is arranged above or below the hose in a gravitational direction.

11. The device according to claim 10, wherein the interference source is operatively configured to cause a compression of the hose.

12. The device according to claim 10, wherein the interference source is arranged in a center region between two ends of the hose.

13. The device according to claim 10, wherein the interference source is a mass-type body.

14. The device according to claim 5, wherein the interference source is operatively configured to cause a compression of the hose.

15. The device according to claim 5, wherein the interference source is arranged in a center region between two ends of the hose.

16. The device according to claim 5, wherein the interference source is a mass-type body.

17. The device according to claim 1, further comprising:
    an acceleration sensor operatively configured to provide a time-dependent acceleration signal useable to provide a qualitative evaluation of the pressure signal by the evaluating unit.

18. The device according to claim 17, wherein the acceleration sensor is a chassis sensor system.

19. A process for controlling a person protection system of a motor vehicle equipped with a sensor system having a hose arranged along a width of a body section of the motor vehicle and being closed-off via a pressure sensor on at least one end, wherein in an event of an impact of an object with the motor vehicle, a pressure change is caused in an interior of the hose due to deformation of the hose, the pressure change being indicated via a pressure signal of the pressure sensor, the process comprising the acts of:
    detecting vibrations, with an evaluating unit operatively arranged in the motor vehicle to receive the pressure signal, said vibrations originating from the motor vehicle during a driving operation and being coupled into the hose in order to produce pressure fluctuations in an interior of the hose that are less than a pressure fluctuation caused by an impacting object; and evaluating, by the evaluating unit, the detected vibrations originating from the motor vehicle for a predefined time period in order to diagnose damage to at least one of the hose and to a connection of the hose to the pressure sensor.

20. The process according to claim 19, further comprising the act of:

processing a time-dependent acceleration signal from an acceleration sensor operatively arranged in the motor vehicle in order to provide a qualitative evaluation of the pressure signal by the evaluating unit.

* * * * *